United States Patent
Hwang et al.

(10) Patent No.: US 8,179,759 B2
(45) Date of Patent: May 15, 2012

(54) INFORMATION STORAGE MEDIUM AND RECORDING/REPRODUCING APPARATUS AND METHOD USING THE SAME

(75) Inventors: Sung-hee Hwang, Suwon-si (KR); Kyung-geun Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 878 days.

(21) Appl. No.: 11/201,300

(22) Filed: Aug. 11, 2005

(65) Prior Publication Data

US 2006/0087954 A1 Apr. 27, 2006

(30) Foreign Application Priority Data

Oct. 22, 2004 (KR) .................. 10-2004-0084632

(51) Int. Cl.
*G11B 11/00* (2006.01)
*G11B 7/24* (2006.01)
*G11B 3/70* (2006.01)
*G11B 27/19* (2006.01)

(52) U.S. Cl. ............... 369/53.21; 369/275.1; 369/272.1; 369/53.16

(58) Field of Classification Search ............... 369/53.21, 369/47.14, 53.15, 53.16, 53.17, 272.1, 275.1
See application file for complete search history.

(56) References Cited

U.S. PATENT DOCUMENTS

| | | | | |
|---|---|---|---|---|
| 5,420,838 A * | 5/1995 | Maeda et al. | ............... | 369/30.09 |
| 6,215,746 B1 * | 4/2001 | Ando et al. | ............... | 369/53.2 |
| 6,643,085 B2 * | 11/2003 | Shirai et al. | ............... | 360/60 |
| 6,765,853 B1 * | 7/2004 | Ko et al. | ............... | 369/53.21 |
| 6,788,642 B2 * | 9/2004 | Hirotsune et al. | ............... | 369/275.3 |
| 6,839,504 B1 * | 1/2005 | Gotoh et al. | ............... | 386/111 |
| 7,106,676 B2 * | 9/2006 | Matos | ............... | 369/53.21 |
| 7,313,065 B2 * | 12/2007 | Park | ............... | 369/53.15 |
| 2001/0048659 A1 * | 12/2001 | Weirauch et al. | ............... | 369/275.3 |
| 2003/0021201 A1 * | 1/2003 | Kobayashi | ............... | 369/47.39 |
| 2004/0013059 A1 * | 1/2004 | Sasaki et al. | ............... | 369/47.12 |
| 2005/0254379 A1 * | 11/2005 | Hwang | ............... | 369/53.2 |
| 2009/0282190 A1 | 11/2009 | Weirauch et al. | | |

FOREIGN PATENT DOCUMENTS

| | | |
|---|---|---|
| EP | 1 049 089 | 4/2000 |
| EP | 1 049 089 | 11/2000 |
| EP | 1049089 A2 | 11/2000 |
| EP | 1 089 275 | 4/2001 |
| EP | 1 327 983 | 7/2003 |

(Continued)

OTHER PUBLICATIONS

Search Report issued in International Patent Application PCT/KR2005/003357 on Jan. 6, 2006.

(Continued)

*Primary Examiner* — Joseph Feild
*Assistant Examiner* — Aneeta Yodichkas
(74) *Attorney, Agent, or Firm* — NSIP Law

(57) ABSTRACT

An information storage medium and a recording/reproducing apparatus and method, the information storage medium includes: an area for recording information regarding a predetermined function applied thereto, wherein the information regarding the predetermined function includes specific information in which set information regarding the predetermined function is set by a recording/reproducing apparatus that can recognize the predetermined function, and common information set by the recording/reproducing apparatus that can recognize the predetermined function based on corresponding information dependent upon the set information so that a recording/reproducing apparatus that cannot recognize the predetermined function can use the predetermined function. Accordingly, a recording/reproducing apparatus that cannot recognize a predetermined function can properly use a medium having the predetermined function.

12 Claims, 12 Drawing Sheets

FOREIGN PATENT DOCUMENTS

| | | |
|---|---|---|
| EP | 1327983 A2 | 7/2003 |
| EP | 1 414 037 | 4/2004 |
| EP | 1 587 075 | 10/2005 |
| EP | 1 600 975 | 11/2005 |
| JP | 11-306648 | 11/1999 |
| JP | 2000-322841 | 11/2000 |
| JP | 2002-190161 | 7/2002 |
| JP | 2003-228909 | 8/2003 |
| JP | 2005-004952 | 1/2005 |
| WO | WO 2004/081926 | 9/2004 |

OTHER PUBLICATIONS

Canadian Office Action Issued on Mar. 10, 2010, in corresponding Canadian Application No. 2 584 650 (3 pages).

Preliminary Notice of First Office Action issued on Apr. 19, 2010, in corresponding Taiwanese Application No. 094129052 (5 pages).

Japanese Office Action issued on Dec. 7, 2010, in corresponding Japanese Application No, 2007-537794 (2 pages).

Japanese Office Action issued on Dec. 7, 2010, in corresponding Japanese Application No. 2007-537794 (2 pages).

Office Action issued on Jun. 14, 2011 in corresponding Japanese Application No. 2007-537794 (4 pages with Translation).

Office Action issued on May 31, 2011 in corresponding Canadian Application No. 2584650 (3 pages).

Indonesian Office Action issued Oct. 10, 2011, in counterpart Indonesian Application No. WO0200701269 (2pp.).

\* cited by examiner

INFORMATION STORAGE MEDIUM AND RECORDING/REPRODUCING APPARATUS AND METHOD USING THE SAME

CROSS-REFERENCE TO RELATED APPLICATIONS

This application claims the benefit of Korean Patent Application No. 2004-84632, filed on Oct. 22, 2004 in the Korean Intellectual Property Office, the disclosure of which is incorporated herein in its entirety by reference.

BACKGROUND OF THE INVENTION

1. Field of the Invention

An aspect of the present invention relates to an information storage medium, and more particularly, to an information storage medium that can improve compatibility, and a recording/reproducing apparatus and method using the same.

2. Description of the Related Art

Since standards for optical systems including an optical disk drive system and optical disks were initially established, new functions have been frequently added to the optical systems due to developments in optical disks and semiconductor technology. Therefore, the initially established standards need to be updated.

FIG. 1 is a reference diagram illustrating a problem according to the prior art.

Referring to FIG. 1, a conventional standard is referred to as an "old standard" and a standard updated by adding new functions to the old standard is referred to as a "new standard." Thus, an old standard disk 12 is operates in an old standard drive system 11, and a new standard disk 14 operates in a new standard drive system 13.

The old standard and the new standard may or may not have recording/reproducing compatibility due to the new added functions. If the two standards have the recording/reproducing compatibility, the old standard disk 12 can be recorded/reproduced in the new standard drive system 13 and that the new standard disk 14 can be recorded/reproduced in the old standard drive system 11.

To guarantee recording/reproducing compatibility between the old standard and the new standard, when the new standard disk 14 having the new functions is loaded into the old standard drive system 11, the old standard drive system 11 should recognize the new functions. To do this, when the old standard is established, it is necessary to define a proper procedure for adding new functions. This proper countermeasure should be equally applicable to any new standard when new functions are added.

For a series of standards to maintain recording/reproducing compatibility, the addition of new functions should be taken into account when an initial standard is established. To do this, a rule by which a current drive system should operate according to functions covered by a current standard and a rule by which the current drive system should operate according to functions to be added in the future, which are not covered by the current standard, should be defined. That is, when a new standard is established by adding new functions to the current standard, if a drive system according to the new standard stores on a disk an operation that a drive system according to the current standard should perform according to the new functions, even if a new disk to which the new functions are added is loaded into the drive system according to the current standard, the drive system according to the current standard can read information stored in the new disk and perform the operation according to the new functions. In other words, there is needed a method by which a drive system according to a new standard can inform a drive system according to a current standard how to operate a new disk to which new functions are added even though the drive system according to the current standard does not know what the new functions added to the new standard are.

SUMMARY OF THE INVENTION

According to an aspect of the present invention, there is provided an information storage medium which can improve disk compatibility in drive systems operating according to different standards, and a recording/reproducing apparatus and method using the same.

According to another aspect of the present invention, there is provided an information storage medium to which an area to record information regarding a predetermined function applied thereto is assigned, wherein the information regarding the predetermined function includes specific information in which set information regarding the predetermined function is set by a recording/reproducing apparatus that can recognize the predetermined function, and common information set by the recording/reproducing apparatus that can recognize the predetermined function based on corresponding information dependent upon the set information so that a recording/reproducing apparatus that cannot recognize the predetermined function can use the predetermined function.

According to an aspect of the present invention the information regarding the predetermined function may include access control data (ACD).

According to an aspect of the present invention the specific information may include higher concept information, and the common information may include lower concept information.

According to another aspect of the present invention, there is provided an information storage medium to which an access control area is assigned to record access control data (ACD) including common information so that a recording/reproducing apparatus that cannot recognize a predetermined function applied to the information storage medium can control access to the information storage medium, wherein the common information is based on corresponding information dependent upon set information regarding the predetermined function applied to the medium.

According to an aspect of the present invention the ACD may further include specific information including the set information set by a recording/reproducing apparatus that recognizes the predetermined function.

According to an aspect of the present invention the predetermined function may be a write protection function, the specific information may be write protection state information, and the common information may include at least one of defect management area recordability information, spare area recordability information, and user data area recordability information.

According to an aspect of the present invention if the write protection state information of the specific information is set to a write protection state, at least one of the defect management area recordability information, the spare area recordability information, and the user data area recordability information of the common information may be set to an unrecordable state, and if the write protection state information of the specific information is set to a write protection release state, at least one of the defect management area recordability information, the spare area recordability information, and the user data area recordability information of the common information may be set to a recordable state.

According to an aspect of the present invention the predetermined function may be a read protection function, the specific information may be read protection state information, and the common information may include user data area reproducibility information.

According to an aspect of the present invention if the read protection state information of the specific information is set to a read protection state, the user data area reproducibility information of the common information may be set to an unreproducible state, and if the read protection state information of the specific information is set to a read protection release state, the user data area reproducibility information of the common information may be set to a reproducible state.

According to another aspect of the present invention, there is provided a recording/reproducing apparatus including a write/read unit recording data on or reading data from an information storage medium having an area for recording information regarding a predetermined function applied thereto is assigned; and a controller controlling the write/read unit to record in the area specific information in which set information regarding the predetermined function is included and common information based on corresponding information dependent upon the set information so that a recording/reproducing apparatus that cannot recognize the predetermined function can use the predetermined function.

According to another aspect of the present invention, there is provided a recording/reproducing apparatus including a write/read unit recording data on or reading data from an information storage medium having an access control area assigned to record access control data (ACD) including common information so that a recording/reproducing apparatus that cannot recognize a predetermined function applied to the information storage medium can control access to the information storage medium; and a controller controlling the write/read unit to set the common information based on corresponding information dependent upon set information regarding the predetermined function applied to the information storage medium and record the set common information on the information storage medium.

According to another aspect of the present invention, there is provided a recording/reproducing method including recording data on or reading data from an information storage medium having an area for recording information regarding a predetermined function applied thereto is assigned; and recording in the area specific information in which set information regarding the predetermined function is included and common information set based on corresponding information dependent upon the set information so that a recording/reproducing apparatus that cannot recognize the predetermined function can use the predetermined function.

According to another aspect of the present invention, there is provided a recording/reproducing method including recording data on or reading data from an information storage medium having an access control area assigned to record access control data (ACD) including common information set so that a recording/reproducing apparatus that cannot recognize a predetermined function applied to the information storage medium can control access to the information storage medium; and setting the common information based on corresponding information dependent upon set information regarding the predetermined function applied to the medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
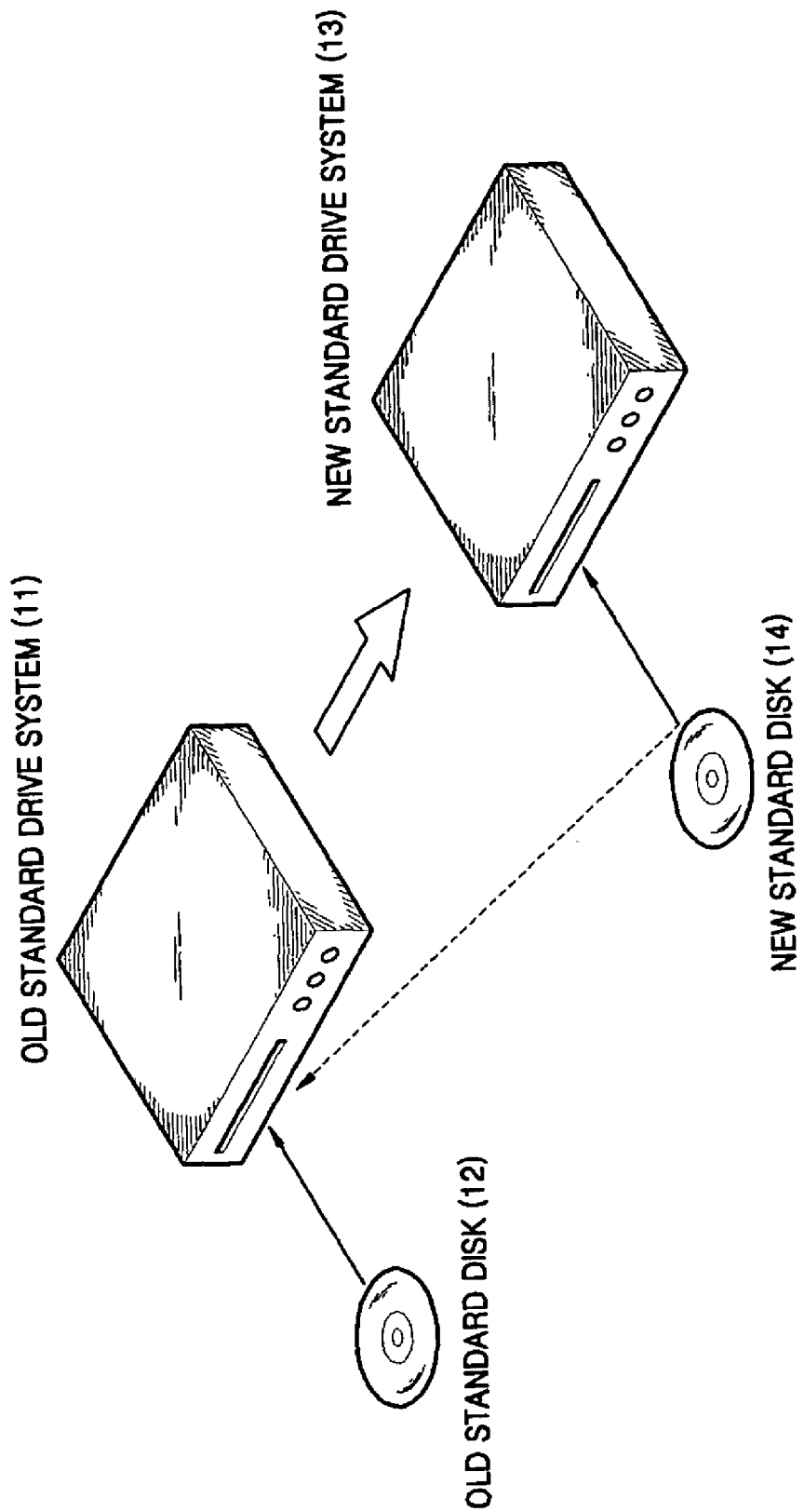
FIG. 1 is a reference diagram illustrating a problem according to the prior art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
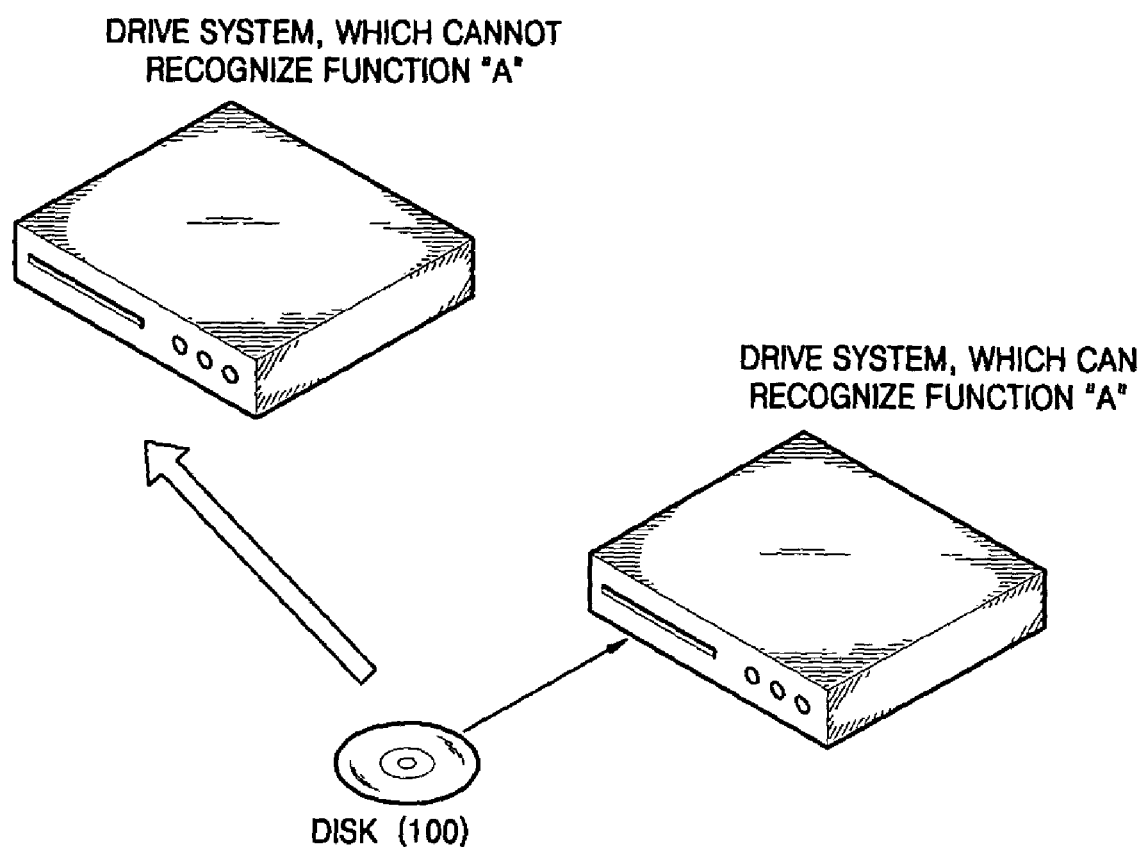
FIG. 2 is a reference diagram for explaining a disk operating method according to an embodiment of the present invention.

FIG. 2 is a reference diagram for explaining a disk operating method according to an embodiment of the present invention.

Referring to FIG. 2, in order for a drive system that cannot recognize a function A to properly operate a disk 100 with the function A, set information for using the function A is recorded on the disk 100, and information corresponding to the set information incorporated into common information, which can be recognized by a drive system that cannot recognize the function A, is recorded on the disk 100.

In an information storage medium according to an embodiment of the present invention, i.e., the disk 100, an access control area is assigned to record access control data (ACD) including a common information field in which information is stored so that a recording/reproducing apparatus that cannot recognize a predetermined function of the medium can control access to the medium and a specific information field in which set information regarding the predetermined function is stored of the recording/reproducing apparatus that can recognize the predetermined function. In the common information field, a portion or all of the set information is determined by a value of an information field limited to the predetermined function for the recording/reproducing apparatus that can recognize the predetermined function applied to the medium so that the recording/reproducing apparatus that cannot recognize the predetermined function applied to the medium can properly control the medium.

In other words, a value is set to the specific information field for the recording/reproducing apparatus that can recognize the predetermined function of the medium according to an intention of a user (a drive manufacturer, a recording and/or reproducing application, a file system drive, a command set, or a final user) using the predetermined function, and a value is set to the common information field to correspond to the set value of the specific information field for the recording/reproducing apparatus that cannot recognize the predetermined function of the medium. The value setting is performed by the recording/reproducing apparatus that can recognize the predetermined function of the medium.

In other words if a higher concept information value (the set value of the specific information) is set according to the user's intended use of a medium, a lower concept information value (the set value of the common information) is determined according to the higher concept set information value, i.e., the user's intended use of the medium.

Figure 3:
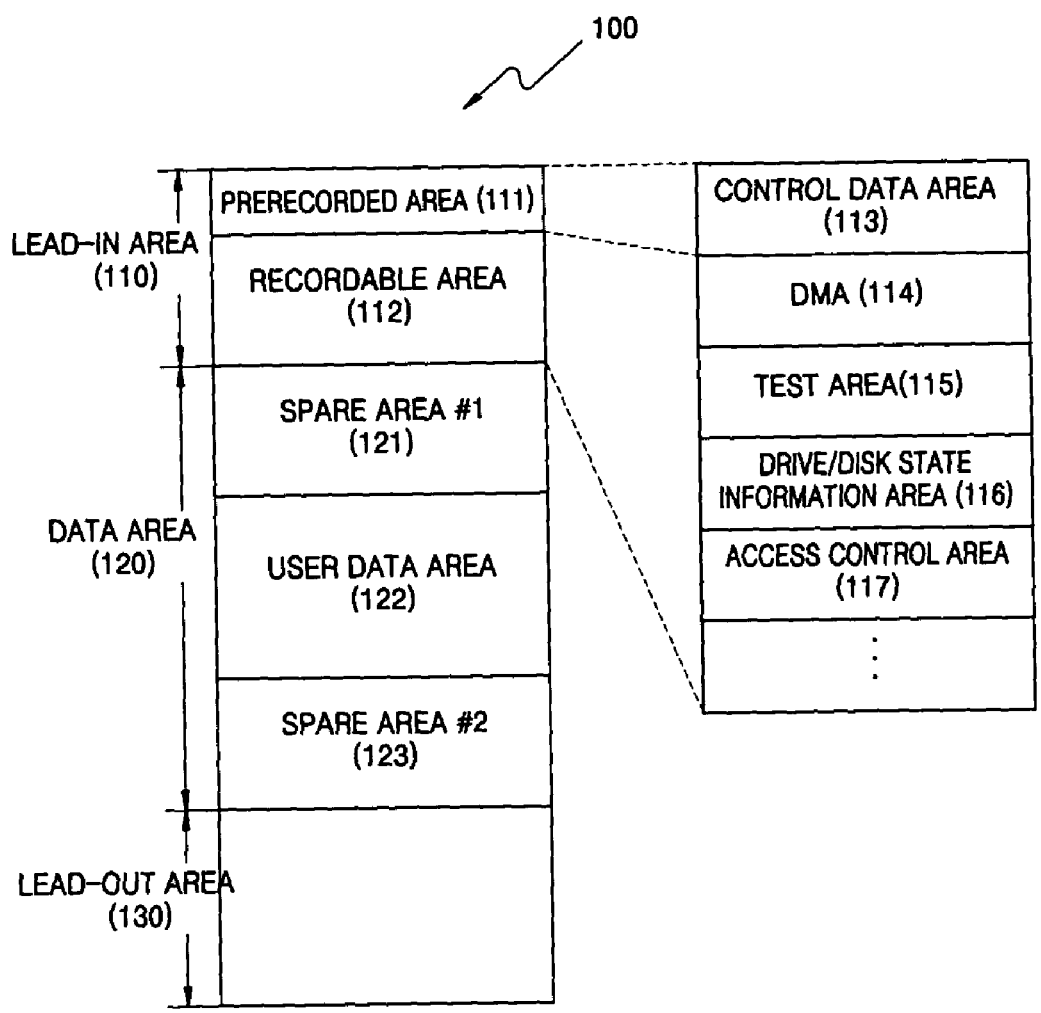
FIG. 3 is a structure of a disk according to an embodiment of the present invention.

FIG. 3 is a structure of the disk 100 according to an embodiment of the present invention.

Referring to FIG. 3, the disk 100 includes a lead-in area 110, a data area 120, and a lead-out area 130, which are sequentially arranged.

The lead-in area 110 includes a prerecorded area 111, which is used for reproduction only since predetermined data has been prerecorded when manufacturing the disk 100, and a recordable area 112 in which data can be recorded and modified.

The data area 120 includes a spare area #1 121, a user data area 122, and a spare area #2 123. The user data area 122 is an area in which user data is recorded. The spare area #1 121 and the spare area #2 123 are areas in which replacement blocks to replace defect blocks generated in the user data area 122 are recorded. These spare areas 121 and 123 are assigned in the data area 120 when the disk 100 is initialized or re-initialized.

The lead-out area 130 may include a defect management area (DMA), etc.

In the prerecorded area 111, disk information is prerecorded when the disk 100 is manufactured. The prerecorded area 111 is called a control data area 113 since control data including a disk identification (ID), such as a disk serial number, for identifying the disk 100 is recorded therein.

The recordable area 112 includes a DMA 114, a test area 115, a drive/disk state information area 116, and an access control area 117.

The DMA 114 is an area in which information on defects generated in the user data area 122 is recorded. The DMA 114 will be described in detail later with reference to FIG. 4.

The test area 115 is an area in which recording power can be tested so that data can be recorded on the disk 100 in an optimal recording condition.

The drive/disk state information area 116 is an area in which state information of a drive system and the disk 100 is recorded.

The access control area 117 is an area for recording information regarding the operation of the drive system in connection with a new function to be added. That is, the access control area 117 is an area in which specific information is recorded, including set information regarding a predetermined function and common information, which allows a drive system that cannot recognize the predetermined function to access the disk 100. The access control area 117 will be described in detail later with reference to FIG. 5.

Figure 4:
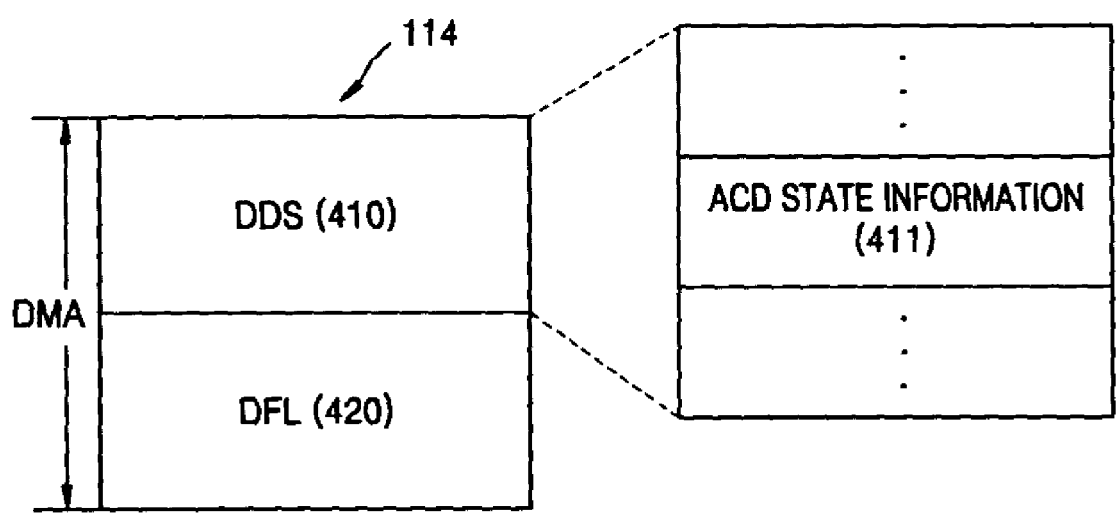
FIG. 4 is an illustration of a detailed structure of a defect management area (DMA) illustrated in FIG. 3.

FIG. 4 is a detailed structure of the DMA 114 illustrated in FIG. 3.

Referring to FIG. 4, the DMA 114 includes a disk definition structure (DDS) 410 and a defect list (DFL) 420.

The DFL 420 contains information of defects detected in the user data area 122. For example, the DFL 420 includes address information of defect blocks detected in the user data area 122, address information of replacement blocks replacing the defect blocks, and state information of the defects.

The DDS 410 contains information of disk management. That is, the DDS 410 includes size information of the spare areas 121 and 123, start and end address information of the user data area 122, and in particular, access control data (ACD) state information 411, all of which are recorded when the disk 100 is initialized or re-initialized.

The ACD state information 411 includes information of recording states or defect states of ACD blocks recorded in the access control area 117. The ACD can be effectively managed by recording the state information of the ACD blocks in the DDS 410. When the ACD blocks are reproduced, if the disk 100 is loaded into a drive system, the drive system can obtain locations in which valid ACD blocks are recorded from the state information of every ACD block stored in the DDS 410 and reproduce the valid ACD blocks.

Figure 5:
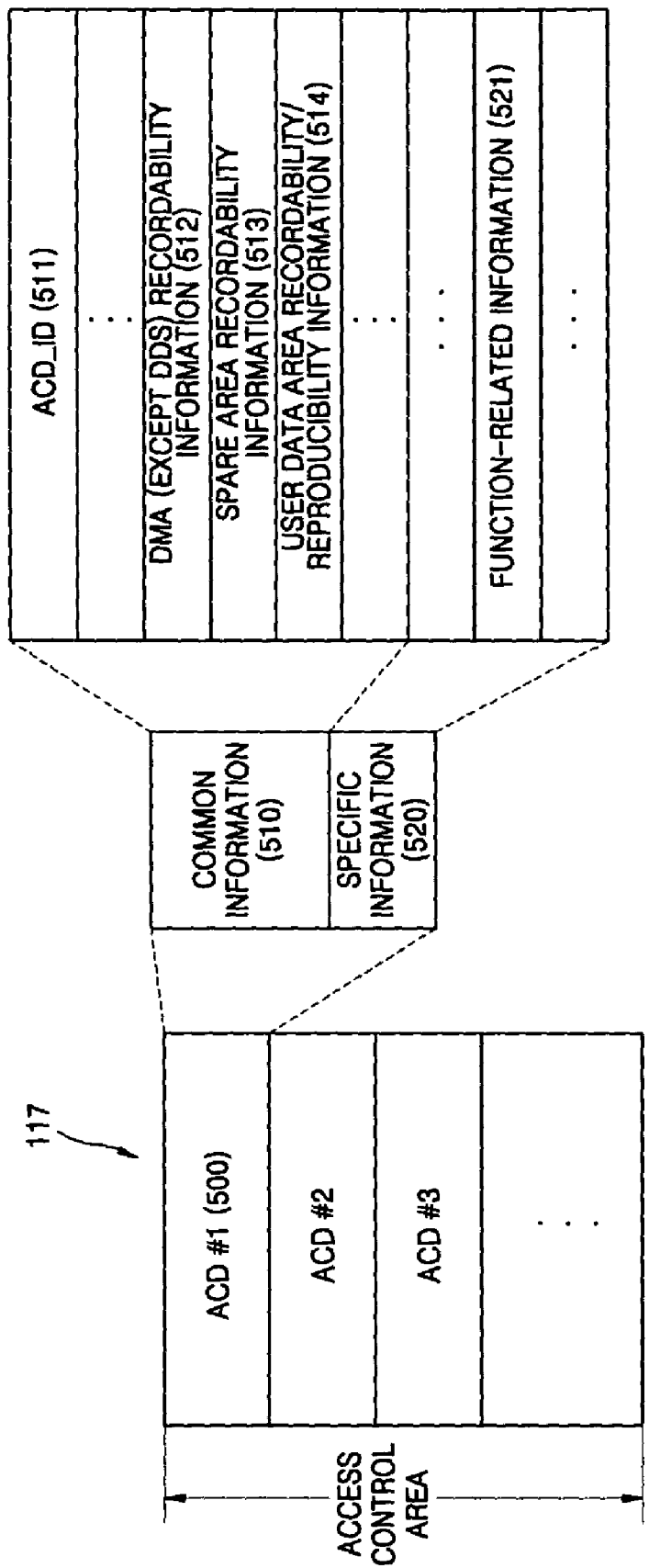
FIG. 5 is a detailed structure of an access control area illustrated in FIG. 3.

FIG. 5 is a detailed structure of the access control area 117 illustrated in FIG. 3.

Referring to FIG. 5, the access control area 117 includes ACD #1, ACD #2, ACD #3, etc.

Each ACD includes common information, which can be recognized by drive systems according to a conventional standard and drive systems according to a new standard obtained by adding a new function to the conventional standard in order to access the disk 100, and specific information, which can be recognized by only drive systems, which can recognize the function of the corresponding ACD.

In other words, the ACD #1 includes specific information and common information with respect to a "function 1," the ACD #2 includes specific information and common information with respect to a "function 2," and the ACD #3 includes specific information and common information with respect to a "function 3." Here, for example, the "function 1" can be a function, which can be recognized by a drive system, and the "function 2" and "function 3" can be functions, which cannot be recognized by the drive system.

The ACD #1 500 includes common information 510 and specific information 520.

The common information 510 includes an ACD_ID 511, which is an identifier for identifying the ACD, DMA recordability information 512 indicating whether data can be recorded in the DMA 114 except the DDS 410, spare area recordability information 513 indicating whether data can be recorded in the spare areas 121 and 123, and user data area recordable/reproducible information 514 indicating whether data can be recorded in or reproduced from the user data area 122.

A drive system can determine whether the ACD #1 500 is related to a recognizable function or an unrecognizable function by checking the ACD_ID 511. That is, if the ACD_ID 511 is an identifier that the drive system already knows, the ACD #1 500 is related to a function that the drive system can recognize, and if the ACD_ID 511 is an identifier that the drive system does not know, the ACD #1 500 is related to a function that the drive system cannot recognize.

Even if the drive system does not know the ACD_ID 511 the drive system can perform a proper operation with respect to the function that the drive system cannot recognize by reading contents stored in the common information 510.

The specific information 520 includes function-related information 521 of the ACD #1 500. The function-related information 521 includes set information such as values set by a user, a file system drive, a predetermined recording/reproducing application, a drive manufacturer, or a command set to use the function of the ACD #1 500 in a desired manner. Since a type, size, or number of the function-related information 521 is determined according to the function, the information field of the function-related information 521 may not always have the same size unlike the common information field.

A recording/reproducing apparatus that can recognize a predetermined function sets information regarding the predetermined function according to a manner intended by specific information of ACD related to the function and sets corresponding information dependent upon the set information included in the specific information or corresponding to the set information to a portion or all of common information. Then, since a recording/reproducing apparatus that cannot recognize the predetermined function can obtain the corresponding information dependent upon the specific information from the common information though the apparatus cannot recognize the specific information of the ACD, the apparatus can obtain information by which a medium corresponding to the function can be operated even if the function cannot be recognized.

That is, ACD related to a predetermined function includes specific information and common information, wherein the specific information is set for a recording/reproducing apparatus that can recognize the predetermined function to perform an operation related to the predetermined function, and the common information is set for a recording/reproducing apparatus that cannot recognize the predetermined function to perform an operation corresponding to the predetermined function.

ACD according to each function is recorded on a medium or only used with respect to functions that can be recognized by a recording/reproducing apparatus when the medium is initialized/re-initialized or when the function is used.

Figure 6A:
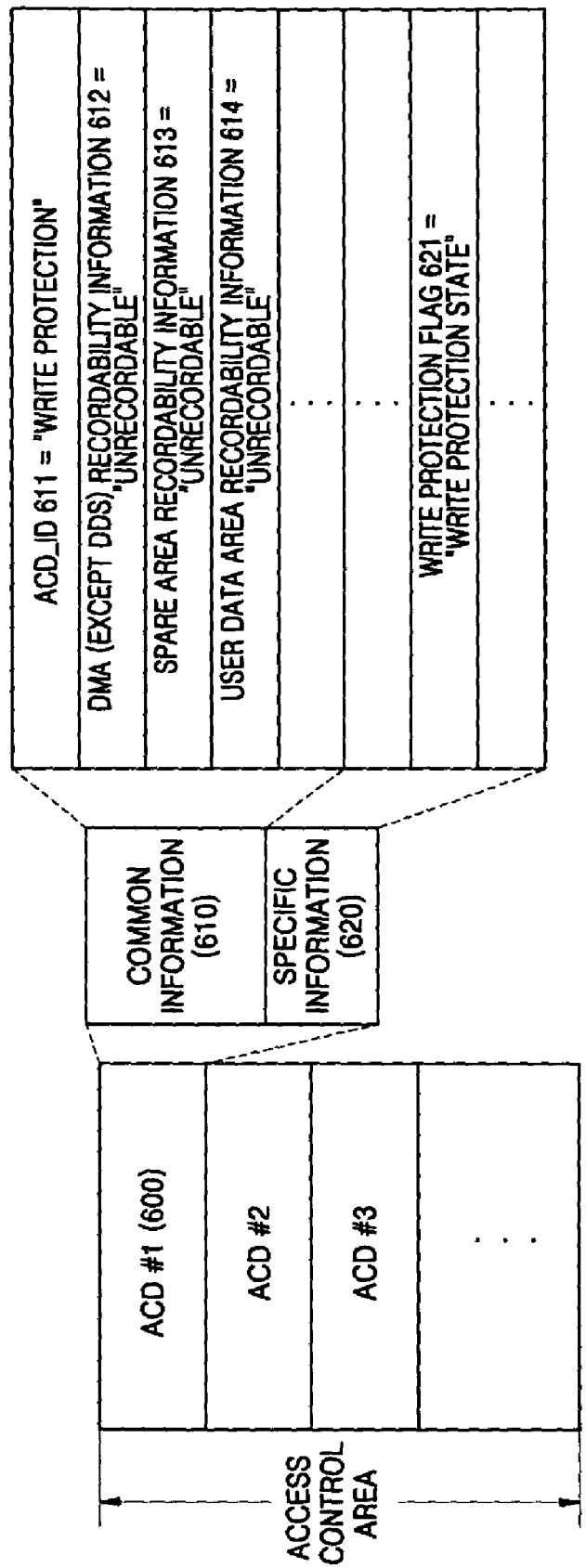
FIG. 6A is an illustration of write protection access control data (ACD) set to a write protection state according to an embodiment of the present invention.
Figure 6B:
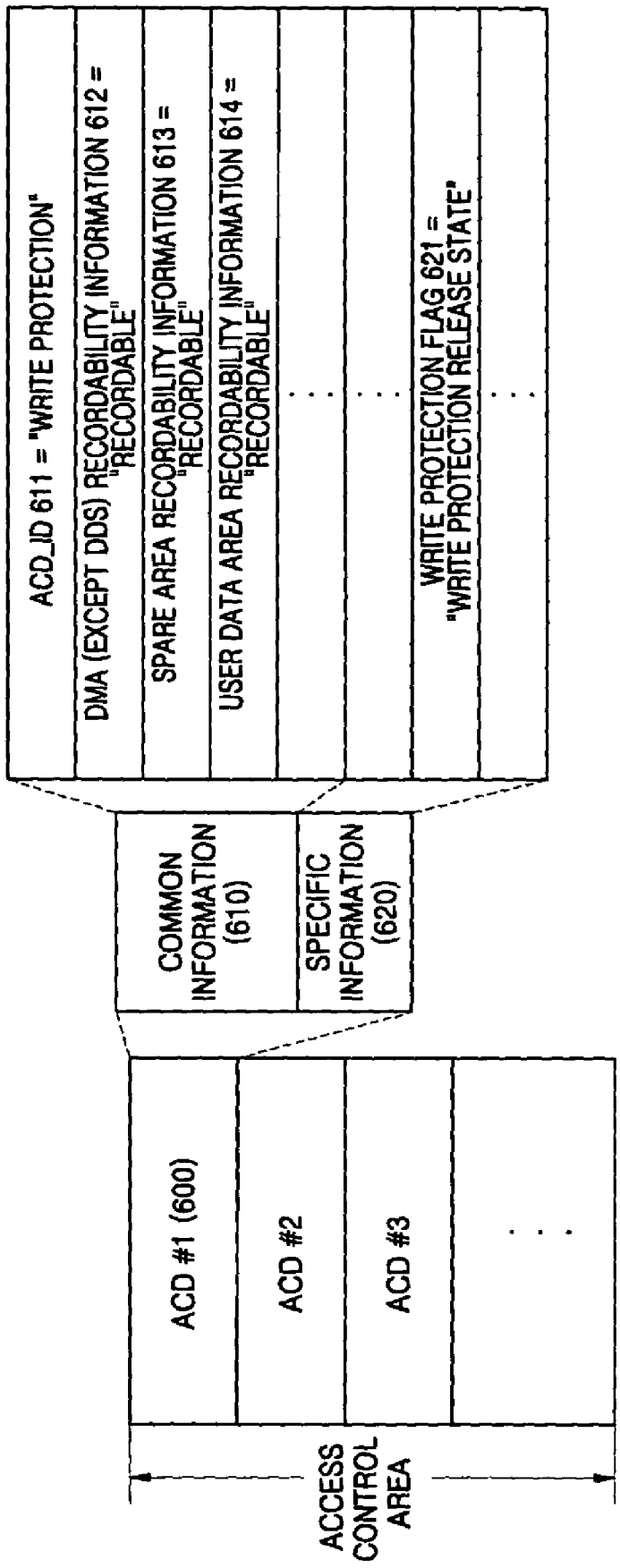
FIG. 6B is an illustration of write protection ACD set to a write protection release state according to an embodiment of the present invention.

FIGS. 6A and 6B are diagrams illustrating set information included in ACD when a predetermined function is a write protection function. The write protection function is a function by which data is prevented from being recorded in some areas of a medium, the entire area of the medium, or a user data area.

FIG. 6A is an illustration of write protection ACD 600 set to a write protection state according to an embodiment of the present invention.

A recording/reproducing apparatus that recognizes the write protection function can use a medium by applying the write protection function to the medium. When a user intends to set a user data area of the medium to the write protection state, the recording/reproducing apparatus that recognizes the write protection function sets a write protection flag 621 of specific information 620 of the write protection ACD (ACD #1) 600 to the write protection state as illustrated in FIG. 6A. In addition, for recording/reproducing apparatuses that cannot recognize the write protection function, the recording/reproducing apparatus that recognizes the write protection function sets at least one of the information fields related to recording of the user data area among common information 610 of the write protection ACD 600, such as DMA (except DDS) recordability information 612, spare area recordability information 613, and user data area recordability information 614, to an unrecordable state as illustrated in FIG. 6A.

In an information storage medium for which defect management is performed by a drive system, if a defect is detected when data is being recorded in a user data area, a spare area is assigned for a replacement area, and a DMA for defect management information indicating its replacement state and information related to disk recording and a DDS is assigned. Due to this, the write protection of the user data area is related to the DMA and write protection of the spare area. In addition, the DDS is excluded from the DMA since state information of the ACD is stored in the DDS. That is, if the DDS is in the write protection state, a change of the state information due to an update of the ACD cannot affect the DDS. If state information of an area in which the ACD is recorded is not stored in the DDS, DMA recordability information can be simply used without excluding the DDS. In a case of write-once information storage media, the DMA corresponds to a temporary defect management area (TDMA), and the DDS corresponds to a temporary disk definition structure (TDDS).

FIG. 6B is an illustration of the write protection ACD 600 set to a write protection release state according to an embodiment of the present invention.

When the user intends to release the write protection state of the medium, the recording/reproducing apparatus that recognizes the write protection function sets the write protection flag 621 of the specific information 620 of the write protection ACD 600 to the write protection release state as illustrated in FIG. 6B. In addition, for the recording/reproducing apparatuses that cannot recognize the write protection function, the recording/reproducing apparatus that recognizes the write protection function sets at least one of the information fields related to recording of the user data area among the common information 610 of the write protection ACD 600, such as the DMA (except DDS) recordability information 612, the spare area recordability information 613, and the user data area recordability information 614, to a recordable state as illustrated in FIG. 6B. By doing this, even if this medium is loaded into a recording/reproducing apparatus that cannot recognize the write protection function in the future, the medium can be used according to the write protection function granted to the medium by referring to the common information 610 of the write protection ACD 600.

In other words, if the write protection state is set, a DMA (except DDS), a spare area, and a user data area are set to the unrecordable state, and if the write protection release state is set, the DMA (except DDS), the spare area, and the user data area are set to the recordable state. By doing this, the recording/reproducing apparatuses that cannot recognize the write protection function can also use a medium in which write protection ACD is used according to an original purpose, thereby increasing medium usage efficiency.

Figure 7A:
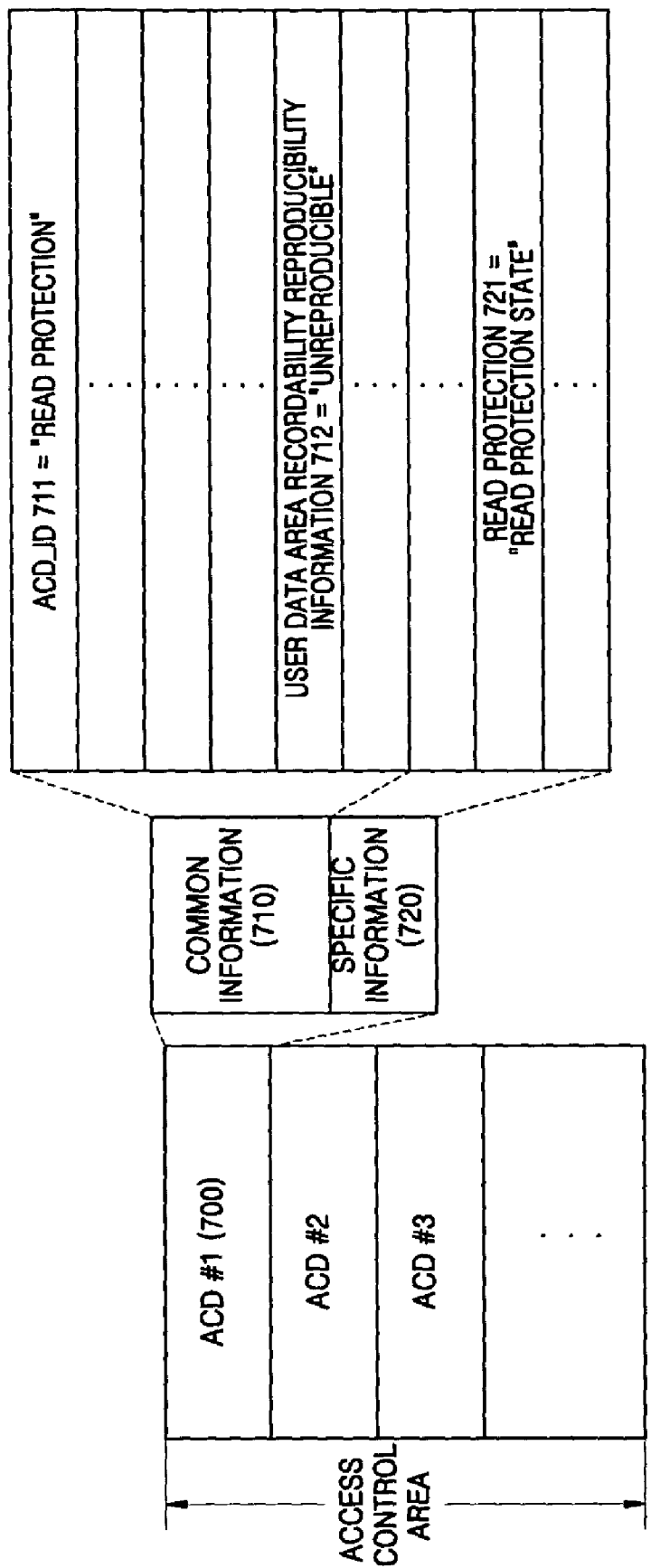
FIG. 7A is an illustration of read protection ACD set to a read protection state according to an embodiment of the present invention.
Figure 7B:
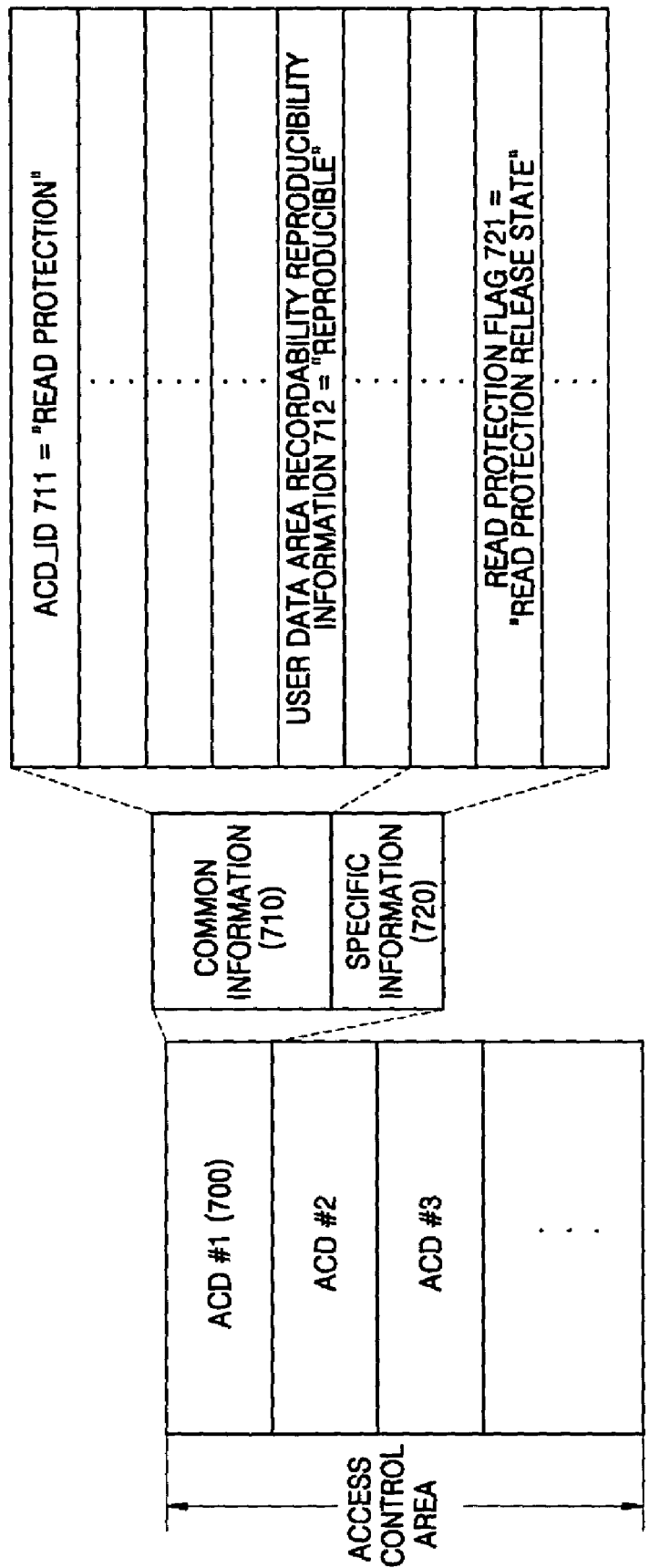
FIG. 7B is an illustration of read protection ACD set to a read protection release state according to an embodiment of the present invention.

FIGS. 7A and 7B are diagrams illustrating set information included in ACD when a predetermined function is a read protection function. The read protection function is a function by which data is prevented from being reproduced from some areas of a medium, the entire area of the medium, or a user data area.

FIG. 7A is an illustration of read protection ACD 700 set to a read protection state according to an embodiment of the present invention.

A recording/reproducing apparatus that recognizes the read protection function can use a medium by applying the read protection function to the medium. When a user intends to set a user data area of the medium to the read protection state, the recording/reproducing apparatus that recognizes the read protection function sets a read protection flag 721 of specific information 720 of the read protection ACD (ACD #1) 700 to the read protection state as illustrated in FIG. 7A. In addition, for recording/reproducing apparatuses that cannot recognize the read protection function, the recording/reproducing apparatus that recognizes the read protection function sets at least one of the information fields related to reproduction of the user data area among common information 710 of the read protection ACD 700, such as user data area recordable/reproducible information 712, to an unreproducible state as illustrated in FIG. 7A.

FIG. 7B is an illustration of the read protection ACD 700 set to a read protection release state according to an embodiment of the present invention.

When the user intends to release the read protection state set to the medium, the recording/reproducing apparatus that recognizes the read protection function sets the read protection flag 721 of the specific information 720 of the read protection ACD 700 to the read protection release state as illustrated in FIG. 7B. In addition, for the recording/reproducing apparatuses that cannot recognize the read protection function, the recording/reproducing apparatus that recognizes the read protection function sets at least one of the information fields related to reproduction of the user data area among the common information 710 of the read protection ACD 700, such as the user data area recordable/reproducible information 712 to a reproducible state as illustrated in FIG. 7B. By doing this, even if this medium is loaded into a recording/reproducing apparatus that cannot recognize the read protection function in the future, the medium can be used according to the read protection function granted to the medium by referring to the common information 710 of the read protection ACD 700.

In other words, if the read protection state is set, a user data area is set to the unreproducible state, and if the read protection release state is set, the user data area is set to the reproducible state. By doing this, the recording/reproducing apparatuses that cannot recognize the read protection function can also use a medium in which read protection ACD is used according to an original purpose, thereby increasing medium usage efficiency.

Figure 8:
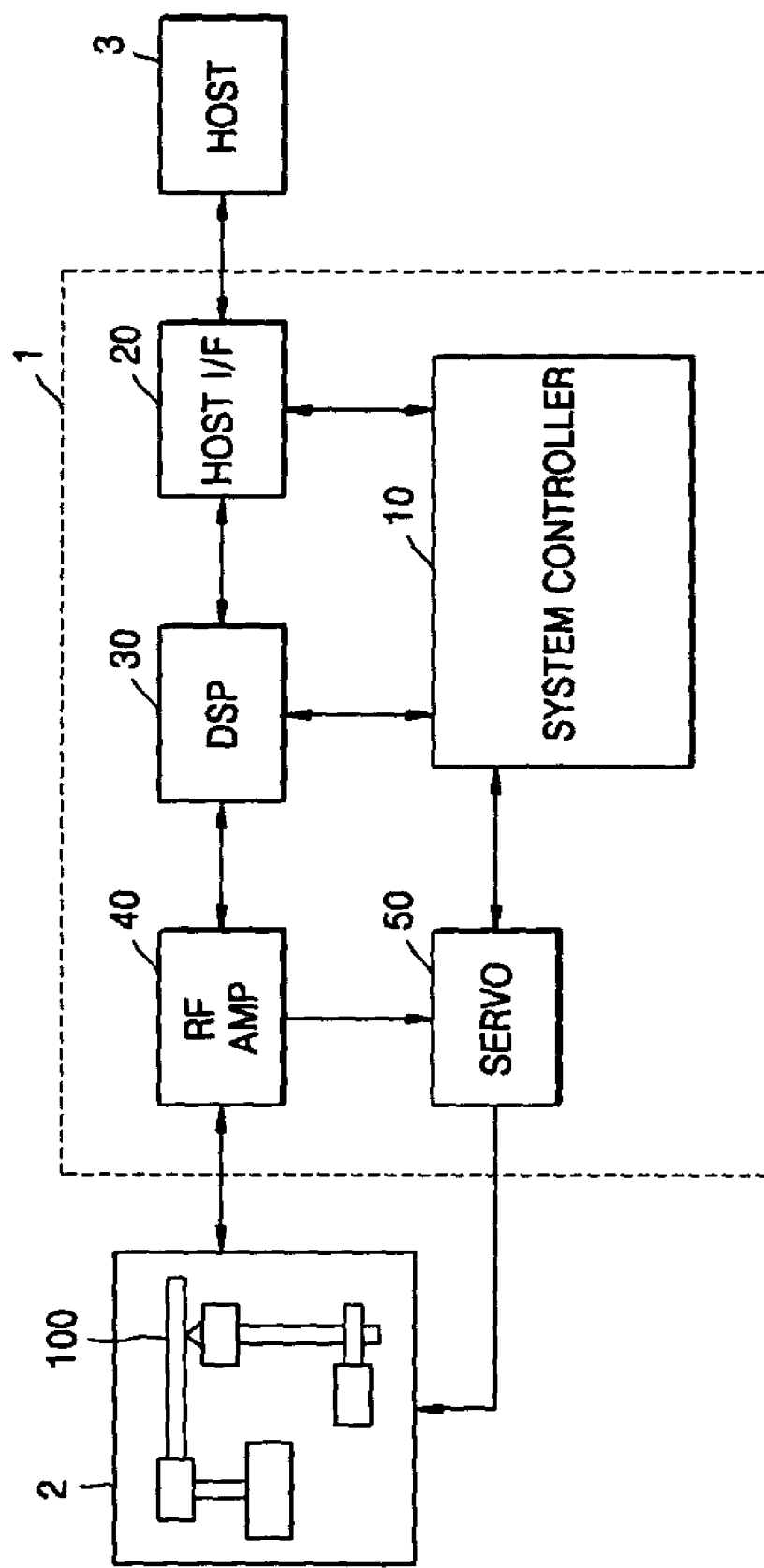
FIG. 8 is a schematic block diagram of a recording/reproducing apparatus operating a disk according to an embodiment of the present invention.

FIG. 8 is a schematic block diagram of a recording/reproducing apparatus operating a disk according to an embodiment of the present invention.

Referring to FIG. 8, the recording/reproducing apparatus includes a write/read unit 2 and a controller 1.

The write/read unit 2 records data on the disk 100, which is an optical information storage medium according to the present embodiment, and reads data recorded on the disk 100 using a pickup device. In particular, when the controller 1 generates or modifies ACD related to a function known by the controller 1, the controller 1 sets information regarding the function to specific information of the ACD and also sets corresponding information dependent upon the set information to common information of the ACD for recording/reproducing apparatuses that cannot recognize the function.

The controller 1 includes a system controller 10, a host interface (I/F) 20, a digital signal processor (DSP) 30, a radio frequency amplifier (RF AMP) 40, and a servo 50.

In a recording operation, the host I/F 20 receives a predetermined write command from a host 3 and transmits it to the system controller 10. The system controller 10 controls the DSP 30 and the servo 50 in order to perform the write command received from the host I/F 20. The DSP 30 adds additional data such as parity bits for error correction to data to be recorded which is received from the host I/F 20, generates an error correction code (ECC) block by performing ECC encoding on the data, and modulates the generated ECC block in a predetermined way. The RF AMP 40 converts the data output from the DSP 30 to an RF signal. The write/read unit 2 including the pickup device records the RF signal output from the RF AMP 40 on the disk 100. The servo 50 receives a command required for a servo control from the system controller 10 and servo-controls the pickup device of the write/read unit 2. In particular, according to the embodiments of the present invention, when the system controller 10 sets set information regarding a function known by the system controller 10, the system controller 10 manages ACD so that recording/reproducing apparatuses that cannot recognize the function can also operate the disk 100. For example, when the system controller 10 applies the write protection function to the disk 100, if the system controller 10 sets a write protection flag of specific ACD information to the write protection state, the system controller 10 also sets information regarding some areas or the entire area of the disk 100 among common information to the unrecordable state.

In a reproduction operation, after the host I/F 20 receives a reproduction command from the host 3, the system controller 10 performs initialization for reproduction. The write/read unit 2 radiates a laser beam on the disk 100 and outputs an optical signal obtained by receiving the laser beam reflected from the disk 100. The RF AMP 40 converts the optical signal output from the write/read unit 2 to an RF signal, provides modulated data obtained from the RF signal to the DSP 30, and provides a servo control signal obtained from the RF signal to the servo 50. The DSP 30 demodulates the modulated data and outputs data obtained through ECC error correction. The servo 50 servo controls the pickup device based on the servo control signal received from the RF AMP 40 and the command required for the servo control received from the system controller 10. Then the host I/F 20 transmits data received from the DSP 30 to the host 3. The system controller 10 controls the servo 50 (the write/read unit 2) to read specific information of ACD recorded in an access control area of the disk 100 in order to obtain set information related to a function known by the system controller 10 and controls the servo 50 (the write/read unit 2) to read common information of the ACD recorded in the access control area of the disk 100 in order to obtain set information related to a function unknown by the system controller 10.

The recording/reproducing apparatus illustrated in FIG. 8 can be implemented using specific recording and reproducing apparatuses or one recording/reproducing apparatus.

Figure 9:
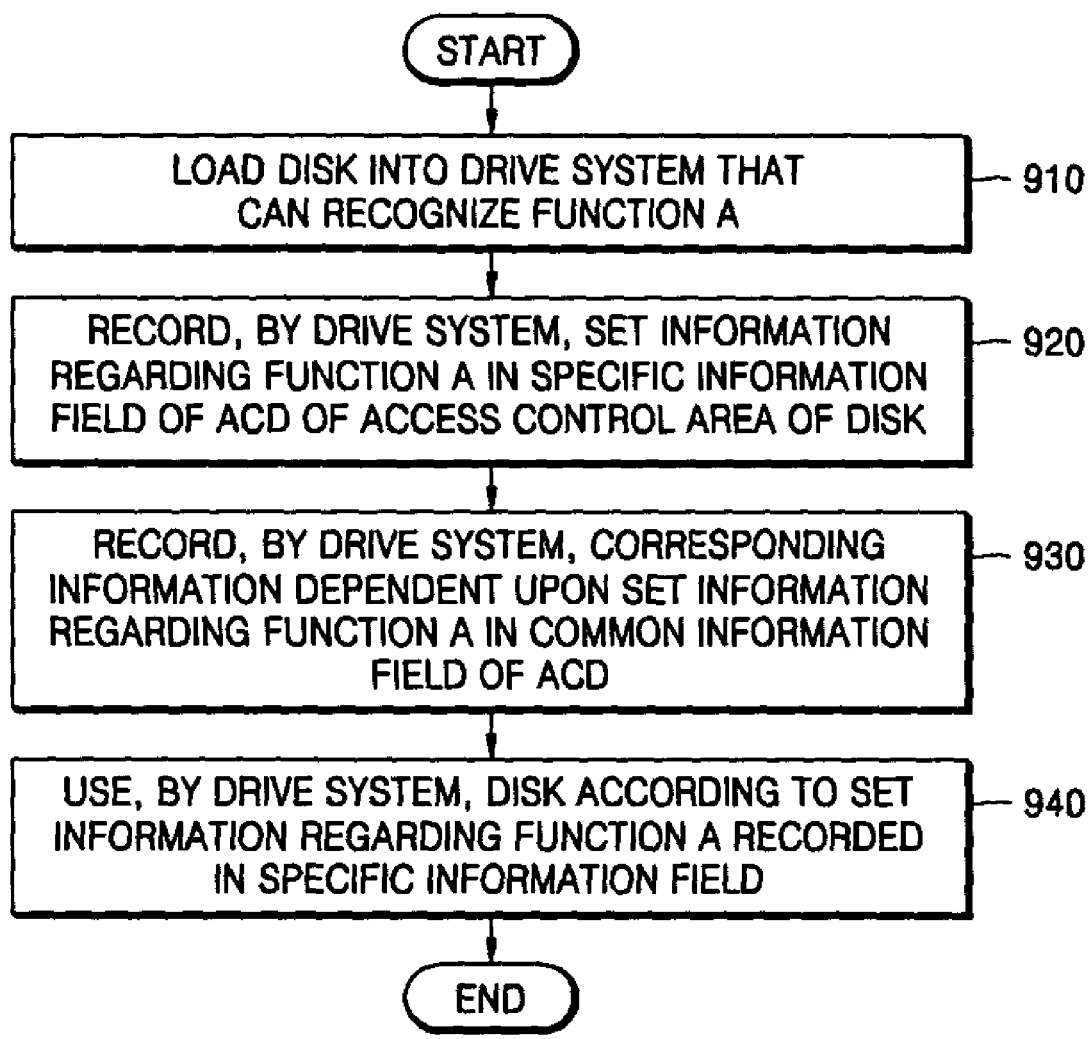
FIG. 9 is a flowchart for explaining a disk operating process in a recording/reproducing apparatus which can recognize a function A according to an embodiment of the present invention.

FIG. 9 is a flowchart explaining a disk operating process in a recording/reproducing apparatus which can recognize a function A according to an embodiment of the present invention.

Referring to FIG. 9, a disk is loaded into a drive system that recognizes the function A in operation 910.

When a user intends to apply the function A to the loaded disk, the drive system records set information related to the function A in a specific ACD information field of an access control area of the disk in operation 920. For example, if the function A is a write protection function, the set information related to the function A can be a write protection state or a write protection release state, and if the function A is a read protection function, the set information related to the function A can be a read protection state or a read protection release state.

The drive system records information corresponding to the set information related to the function A in a common ACD information field of the access control area of the disk for recording/reproducing apparatuses that cannot recognize the function A in operation 930. For example, if the set information related to the function A is the write protection state, the common information field can be set to an unrecordable state with respect to some areas or the entire area of the disk, and if the set information related to the function A is the read protection state, the common information field can be set to an unreproducible state with respect to some areas or the entire area of the disk.

The drive system uses the disk according to the set information related to the function A recorded in the specific information field in operation 940. For example, if the set information related to the function A is the write protection state, data is prevented from being recorded on the disk, and if the set information related to the function A is the read protection state, data is prevented from being reproduced from the disk.

Figure 10:
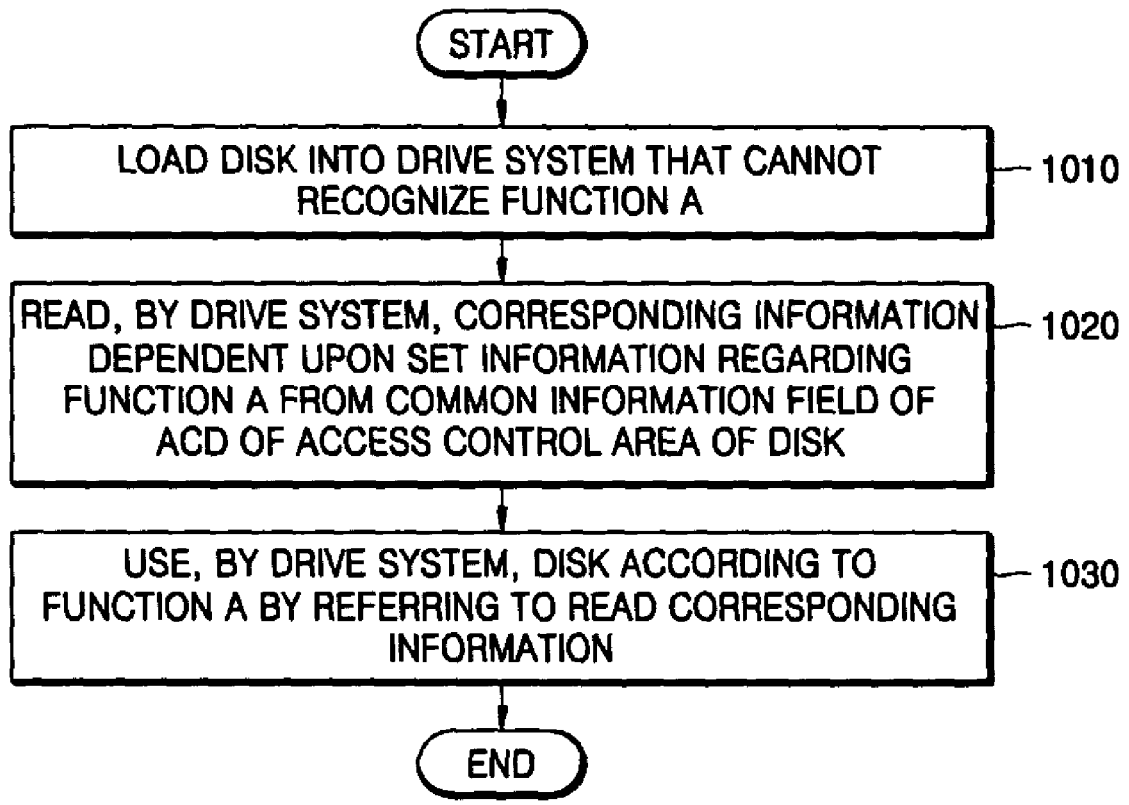
FIG. 10 is a flowchart for explaining a disk operating process in a recording/reproducing apparatus which cannot recognize the function A according to an embodiment of the present invention.

FIG. 10 is a flowchart for explaining a disk operating process in a recording/reproducing apparatus that cannot recognize the function A according to an embodiment of the present invention.

Referring to FIG. 10, a disk is loaded into a drive system that cannot recognize the function A in operation 1010.

The drive system reads corresponding information dependent upon set information related to the function A from a common ACD information field of an access control area of the disk in operation 1020.

The drive system uses the disk according to the function A by referring to the read corresponding information in operation 1030.

The present invention is not limited to the embodiments described above. For example, an information structure of a predetermined function can be constructed of higher concept information and lower concept information. A subject, i.e., a recording/reproducing apparatus, capable of operating the predetermined function, manages the higher concept information in order to use an information storage medium by applying the predetermined function to the medium and also sets the lower concept information so that a subject that is not capable of operating the predetermined function can use the medium to which the predetermined function is applied by referring to the higher concept information.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, DVDs, etc.), and storage media such as carrier waves (e.g., transmission through the internet). The computer readable recording medium can also be distributed over network coupled computer systems so that the computer readable code is stored and executed in a distributed fashion. And the functional programs, codes and code segments for embodying the present invention may be easily construed by programmers in the art to which the present invention belongs.

While this invention has been particularly shown and described with reference to preferred embodiments thereof, it will be understood by those skilled in the art that various changes in form and details may be made therein without departing from the spirit and scope of the invention as defined by the appended claims. The above-described embodiments should be considered in a descriptive sense only and are not for purposes of limitation. Therefore, the scope of the invention is defined not by the detailed description of the invention but by the appended claims, and all differences within the scope will be construed as being included in the present invention.

As described above, according to embodiments of the present invention, a recording/reproducing apparatus that cannot recognize a predetermined function can properly use a medium to which the predetermined function is applied. Thus, disk compatibility in recording/reproducing apparatuses having different standards can be improved.

What is claimed is:

1. An information storage medium, comprising:
a lead-in area, comprising a pre-recorded area and a recordable area, the recordable area comprising an access control area for storing a plurality of access control information blocks; and
a data area,
wherein:
an access control information block of the plurality of access control information blocks includes an identifier corresponding to the access control information block, specific information corresponding to a predetermined function, and common information, the identifier being used by a recording/reproducing apparatus in determining whether the access control information block is related to a recognizable function or an unrecognizable function,
the specific information is used in performing the predetermined function by a recording/reproducing apparatus capable of recognizing the identifier,
the common information is used by a recording/reproducing apparatus incapable of recognizing the identifier to access the information storage medium, the common information comprising at least one value which is set according to a value in the specific information,
the common information includes defect management area recordability information, spare area recordability information, and user data area recordability information,
the defect management area recordability information comprises recordability information on a defect management area excluding a disk definition structure, the disk definition structure storing state information of the access control information, and
the state information of the access control information comprises information of recording states or defect states of the access control information recorded on the access control area.

2. The medium of claim 1, wherein:
the predetermined function comprises a read protection function;
the specific information comprises read protection state information; and
the common information comprises user data area reproducibility information.

3. The medium of claim 2, wherein:
in response to the read protection state information of the specific information being set to a read protection state, the user data area reproducibility information of the common information is set to an unreproducible state; and
in response to the read protection state information of the specific information being set to a read protection release state, the user data area reproducibility information of the common information is set to a reproducible state.

4. The medium of claim 1, wherein the common information comprises a defect management area recordability information, a spare area recordability information, a user data area recordability information, or any combination thereof.

5. The medium of claim 1, wherein the common information comprises information determined by a value of an information field limited to the predetermined function for the apparatus that can recognize the identifier.

6. A recording/reproducing apparatus, comprising:
a write/read unit recording data on and/or reading data from an information storage medium comprising a lead-in area and a data area, the lead-in area comprising a pre-recorded area and a recordable area, the recordable area comprising an access control area for storing a plurality of access control information blocks; and
a controller controlling the write/read unit to record the plurality of access control information blocks on the access control area, an access control information block of the plurality of access control information blocks comprising an identifier corresponding to the access control information block, specific information corresponding to a predetermined function, and common information, the identifier being used by a recording/reproducing apparatus in determining whether the access control information block is related to a recognizable function or an unrecognizable function,
wherein:
the specific information is used in performing the predetermined function by the recording/reproducing apparatus capable of recognizing the identifier;
the common information is used by the recording/reproducing apparatus incapable of recognizing the identifier to access the information storage medium, the common information comprising at least one value which is set according to a value in the specific information;
the common information includes defect management area recordability information, spare area recordability information, and user data area recordability information;
the defect management area recordability information comprises recordability information on a defect management area excluding a disk definition structure, the disk definition structure storing state information of the access control information; and
the state information of the access control information comprises information of recording states or defect states of the access control information recorded on the access control area.

7. The apparatus of claim 6, wherein:
the predetermined function comprises a read protection function;
the specific information comprises read protection state information; and
the common information comprises user data area reproducibility information.

8. The apparatus of claim 7, wherein:
in response to the controller setting the read protection state information of the specific information to a read protection state, the controller sets the user data area reproducibility information of the common information to an unreproducible state; and
in response to the controller setting the read protection state information of the specific information to a read protection release state, the controller sets the user data area reproducibility information of the common information to a reproducible state.

9. A recording/reproducing method, comprising:
recording access control information blocks in an access control area which is arranged in an information storage medium comprising a lead-in area and a data area, the lead-in area comprising a pre-recorded area and a recordable area, the recordable area comprising the access control area for storing a plurality of access control information blocks, an access control information block of the plurality of access control information blocks comprising an identifier corresponding to the access control information block, specific information corresponding to a predetermined function, and common information, the identifier being used by a recording/reproducing apparatus in determining whether the access control information block is related to a recognizable function or an unrecognizable function,
wherein:
the specific information is used in performing the predetermined function by the recording/reproducing apparatus capable of recognizing the identifier,
the common information is used by the recording/reproducing apparatus incapable of recognizing the identifier to access the information storage medium, the common information comprising at least one value which is set according to a value in the specific information,
the common information includes defect management area recordability information, spare area recordability information, and user data area recordability information,
the defect management area recordability information comprises recordability information on a defect management area excluding a disk definition structure, the disk definition structure storing state information of the access control information, and
the state information of the access control information comprises information of recording states or defect states of the access control information recorded on the access control area.

10. The method of claim 9, wherein:
the predetermined function comprises a read protection function;
the specific information comprises read protection state information; and
the common information comprises user data area reproducibility information.

11. The method of claim 10, wherein the setting comprises:
in response to the read protection state information of the specific information being set to a read protection state, setting the user data area reproducibility information of the common information to an unreproducible state; and
in response to the read protection state information of the specific information being set to a read protection release state, setting the user data area reproducibility information of the common information to a reproducible state.

12. A reproducing apparatus for reproducing data from an information storage medium, the apparatus comprising:
a read unit configured to read data from the information storage medium comprising a lead-in area and a data area, the lead-in area comprising a pre-recorded area and a recordable area, the recordable area comprising an access control area for storing a plurality of access control information blocks; and
a controller configured to control the read unit to read the plurality of access control information blocks from the access control area, an access control information block of the plurality of access control information blocks comprising an identifier corresponding to the access control information block, specific information corresponding to a predetermined function, and common information, the identifier being used by a recording/reproducing apparatus in determining whether the access control information block is related to a recognizable function or an unrecognizable function, wherein:

the specific information is used in performing the predetermined function by the recording/reproducing apparatus capable of recognizing the identifier, the common information is used by the recording/reproducing apparatus incapable of recognizing the identifier to access the information storage medium, the common information comprising at least one value which is set according to a value in the specific information, the common information includes defect management area recordability information, spare area recordability information, and user data area recordability information, the defect management area recordability information comprises recordability information on a defect management area excluding a disk definition structure, the disk definition structure storing state information of the access control information, and the state information of the access control information comprises information of recording states or defect states of the access control information recorded on the access control area.

* * * * *